(12) United States Patent
Mazzuca (10) Patent No.: US 6,702,729 B2
(45) Date of Patent: Mar. 9, 2004

(54) CENTRIFUGAL CLEANER FOR INDUSTRIAL LUBRICANTS

(76) Inventor: Michael Mazzuca, 6 Frivick Court, Toronto, Ontario (CA), M2M 3P5

( * ) Notice: Subject to any disclaimer, the term of this patent is extended or adjusted under 35 U.S.C. 154(b) by 0 days.

(21) Appl. No.: 10/083,692

(22) Filed: Feb. 27, 2002

(65) Prior Publication Data

US 2002/0142910 A1 Oct. 3, 2002

Related U.S. Application Data (63) Continuation-in-part of application No. 09/648,617, filed on Aug. 28, 2000, now abandoned.

(51) Int. Cl.$^7$ .............................. B04B 5/10; B04B 9/06
(52) U.S. Cl. .............................. 494/26; 494/31; 494/37; 494/42; 494/49
(58) Field of Search .............................. 494/1, 5, 7, 10, 494/11, 23, 26, 31, 32, 36, 37, 42, 49, 901; 210/168, 171, 232, 360.1, 380.1, 416.5; 184/6.24

(56) References Cited

U.S. PATENT DOCUMENTS

| | | | | |
|---|---|---|---|---|
| 3,366,318 A | * | 1/1968 | Steimel | |
| 3,403,848 A | * | 10/1968 | Windsor et al. | |
| 3,784,092 A | * | 1/1974 | Gibson | |
| 3,791,576 A | * | 2/1974 | Bazil | |
| 4,165,032 A | * | 8/1979 | Klingenberg | |
| 4,431,540 A | * | 2/1984 | Budzich | |
| 4,492,631 A | * | 1/1985 | Martin | 494/901 |
| 4,534,860 A | * | 8/1985 | Budzich | 494/901 |
| 4,591,433 A | * | 5/1986 | Budzich | 494/49 |
| 5,250,180 A | * | 10/1993 | Chang | |
| 5,707,519 A | * | 1/1998 | Miller et al. | |
| 5,733,238 A | * | 3/1998 | Carr | |
| 5,779,618 A | * | 7/1998 | Onodera et al. | 494/24 |
| 5,904,841 A | * | 5/1999 | Penny | 210/168 |
| 6,143,170 A | * | 11/2000 | Briggs et al. | |
| 6,383,394 B1 | * | 5/2002 | Briggs et al. | |
| 6,416,454 B1 | * | 7/2002 | Kessler et al. | |

* cited by examiner

*Primary Examiner*—Charles E. Cooley (57) ABSTRACT

The present invention provides for an improved method and apparatus for cleaning industrial lubricants used in industrial processes. The method comprises providing a centrifugal separator apparatus connected as a bypass or in-line filter in the lubricating or washing fluid tank. The apparatus includes a centrifugal separator having a casing and a rotor rotatably mounted in the casing. A centrifugal pump is provided between the tank and the inlet of the separator. A source of compressed air is provided connected to the casing of the separator. Some of the fluid from the tank is pumped by the centrifugal pump into the separator to cause the rotor to rotate at a speed sufficient to provide a rotational force of the fluid impinging on the casing of between about 1000 g and about 2000 g to thereby clean the fluid. The cleaned fluid is returned to the tank. The volume of air in the casing is maintained by introduction of air into the casing by the source of compressed air. A control panel is provided to monitor the operation of the separator and control the pump and source of compressed air to maintain rotational force of the separator within the range.

4 Claims, 8 Drawing Sheets

CENTRIFUGAL CLEANER FOR INDUSTRIAL LUBRICANTS

CROSS-REFERENCE TO RELATED APPLICATIONS

This application is a continuation-in-part of Ser. No. 09/648,617, filed Aug. 28, 2000, now abandoned.

FIELD OF THE INVENTION

The present invention relates to a filtering apparatus and method for cleaning industrial fluids used in industrial applications. In particular, it relates to a centrifugal separator for use in removing contaminants and cleaning industrial fluids and the method of using the centrifugal separator for cleaning the fluid.

BACKGROUND OF THE INVENTION

Many industrial processes require suitable fluids for proper operation of the machines utilized in the process. For example, stamping operations require that the metal to be stamped be properly washed by a lubricating fluid. In stamping operation, the metal is sprayed or immersed in the fluid and after the washing operation, the fluid is scraped from the surface of the metal to remove contaminants, dirt, etc., present on the surface of the metal. The fluid is then recycled and returned to the equipment for further use in the process. Over time, the fluid becomes contaminated with heavy metals and particulate matter which can result in reduced life of the fluid and the apparatus. At present, such apparatus use cartridge type filters for removing contaminants from the fluid. While such filters are suitable for removing large particulate contaminants, smaller contaminants may pass through the filtering material and are able to continuously circulate through the system. Over time, in order to remove such contaminants, it may be necessary to replace the fluid and wash the system thoroughly. This results in down time for the apparatus and may significantly increase the cost of products produced by the apparatus.

Centrifuge filters have been utilized in certain automotive applications, particularly internal combustion engines such as are described in U.S. Pat. Nos. 4,492,631 and 4,165,032, the disclosures of which are incorporated herein by reference. U.S. Pat. No. 4,492,631 describes a centrifugal separator for separating contaminants from contaminated oil. The separator has an outer casing and a rotor within the casing mounted for rotation about a vertical axis. Oil under pressure enters the rotor at one end and exits the other end through jets into a chamber normally filled with air. As the oil passes through the jets, it causes the rotor to spin within the housing, causing a centrifugal force on the wall of the rotor that attracts the contaminants which adhere to the wall. The cleaned oil flows to the sump and is used in the lubricating of the engine. In order to maintain the flow of oil, it is necessary that the casing retain its air and not fill with oil. This is accomplished by supplying air under pressure to the interior of the casing by means of a float operated valve member that detects the level of oil in the casing. While such centrifugal separators have found use in internal combustion engines, they have not been adapted for other applications.

SUMMARY OF THE INVENTION

The present invention in one aspect provides for an improved method for cleaning industrial lubricants used in industrial processes. The method comprises providing a centrifugal separator apparatus connected as a bypass or in-line filter in the lubricating or washing fluid tank. The centrifugal separator has a casing and a rotor rotatably mounted in the casing. A centrifugal pump is provided between the tank and the inlet of the separator. A source of compressed air is provided connected to the casing of the separator. Some of the fluid from the tank is pumped by the centrifugal pump into the separator to cause the rotor to rotate and impinge the fluid on the casing at a rotational force of between about 1000 g and about 2000 g and clean the fluid. The cleaned fluid is returned to the tank. The volume of air in the casing is maintained by introduction of air into the casing by the source of compressed air. A control panel is provided to monitor the operation of the separator and control the pump and source of compressed air to maintain the rotational force of the separator within the range.

In an aspect of the invention there is provided a centrifugal separator apparatus for use as a bypass or in-line filter in cleaning fluid utilized in industrial applications. The apparatus includes a centrifugal separator having a casing and a rotor rotatably mounted in the casing. A centrifugal pump is provided between the tank and the inlet of the separator for pumping some of the fluid from the tank into the separator to cause the rotor to rotate and impinge the fluid on the casing at a rotational force of between about 1000 g and about 2000 g and clean the fluid. A source of compressed air is provided connected to the casing of the separator for maintaining the volume of air in the casing. A control panel is provided to monitor the operation of the separator and control the pump and source of compressed air to maintain the rotational force of the separator within the range.

BRIEF DESCRIPTION OF THE DRAWINGS

Preferred embodiments of the present invention are illustrated in the attached drawings, in which.

DETAILED DESCRIPTION OF THE PREFERRED EMBODIMENTS

The present invention is directed to an improved method and apparatus for cleaning industrial lubricants used in industrial processes. In a preferred embodiment the method and apparatus is used in a stamping process for stamping of metal parts for use in fabrication operations. Preferably, the stamped metal parts are parts for use in assembly of automobiles.

Figure 1:
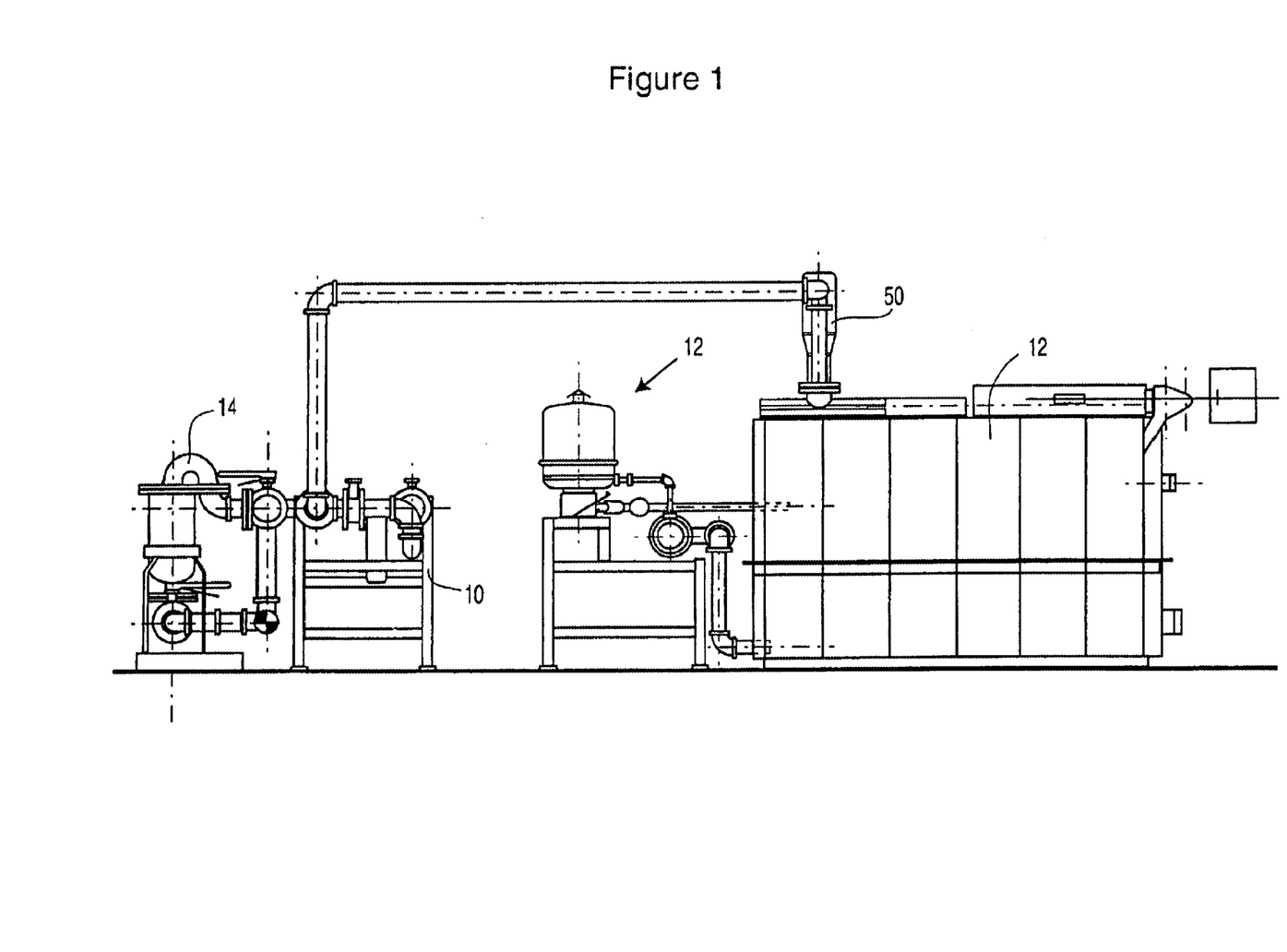
FIG. 1 is a side elevation view of a typical metal stamping apparatus including a centrifugal separator filtering apparatus according to the present invention.

A typical stamping apparatus is illustrated in FIG. 1. The stamping apparatus has the stamping machine for stamping the metal blanks into the desired shape. The metal blanks are fed into the machine along a conveyor system 10. During the passage along the conveyor system 10, the blanks are washed to remove contaminants from the surface of the metal. The blanks are washed by the application of a suitable cleaning fluid, typically a low viscosity oil. The cleaning fluid is applied to the surface of the metal blank by being pumped from a storage tank 12 and then being sprayed or otherwise applied to the surface of the blank. After the surface of the blank has been washed, the fluid containing the contaminants is typically removed from the surface of the blank using an elastomeric blade and returned to the storage tank 12. In a typical stamping operation, the fluid in the tank 12 is cleaned through the use of cartridge or bag filters 14 using suitable filtering elements, either filtering the fluid on its return to the tank 12 or in a bypass mode where some of the fluid from the tank is passed through the filter and then returned to the tank 12.

Figure 2:
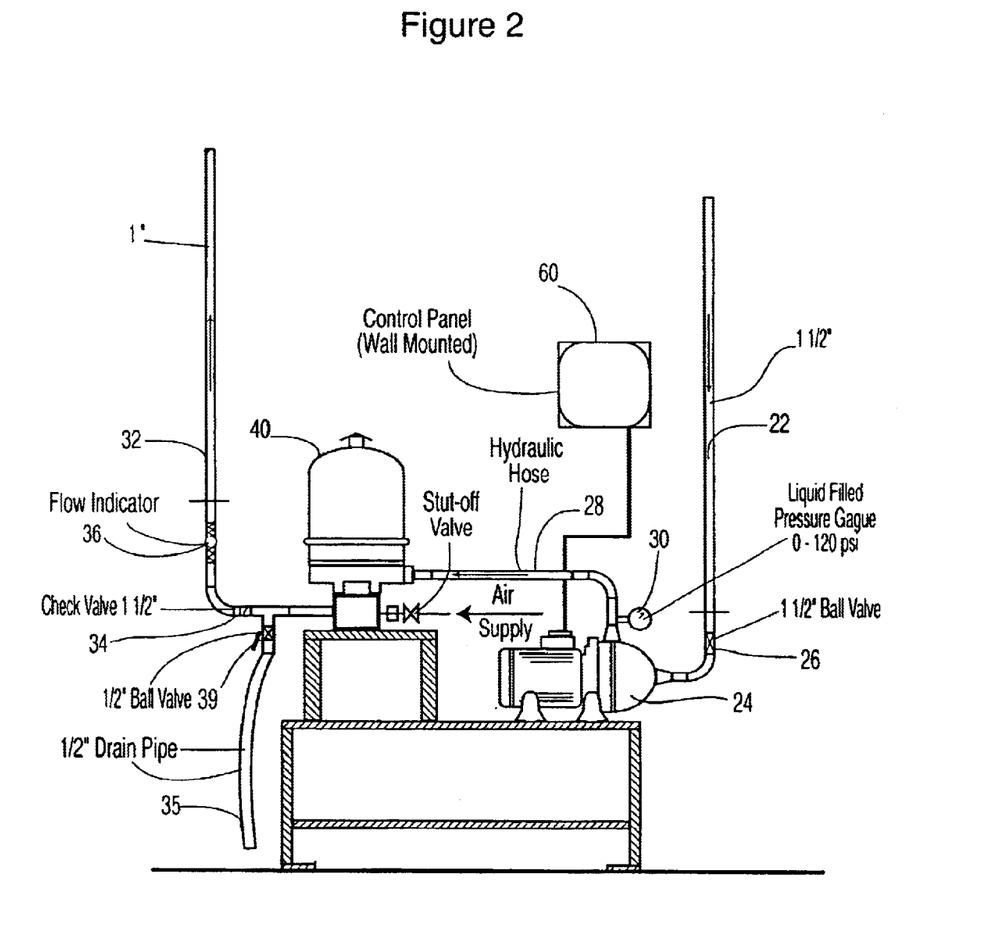
FIG. 2 is a side elevation view of the centrifugal separator filtering apparatus of FIG. 1.
Figure 3:
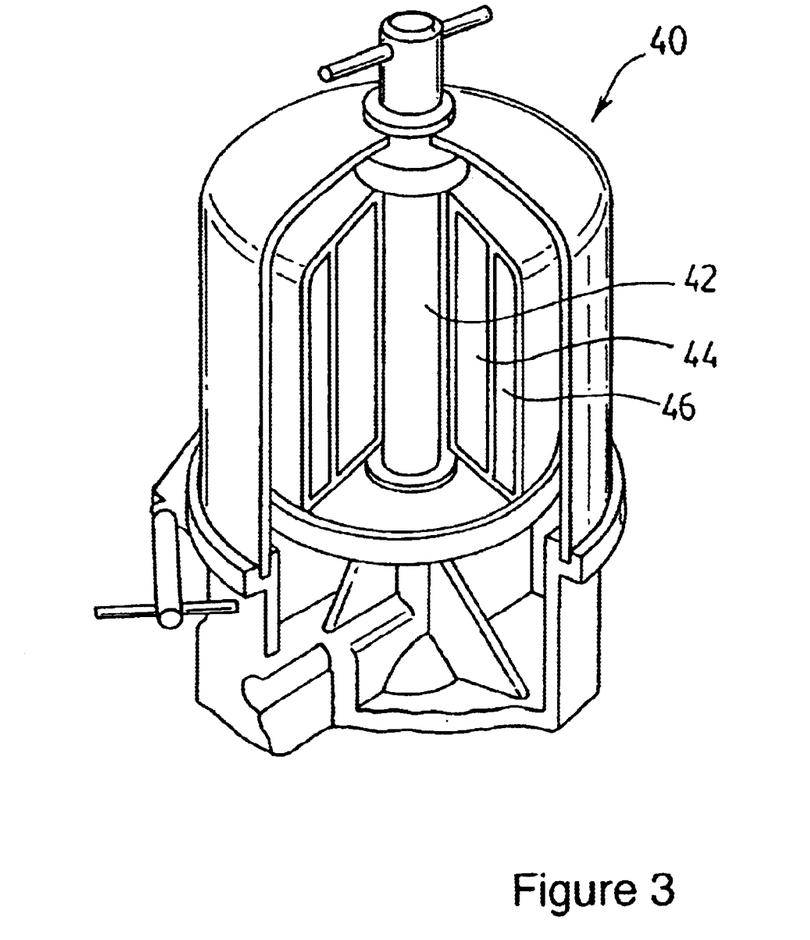
FIG. 3 is a perspective view partly in cross section of a preferred embodiment of the centrifugal separator of the present invention.

The stamping apparatus illustrated in FIG. 1 has been provided with the cleaning apparatus 20 of the present invention including a centrifugal separator operating in a bypass filtering mode. The details of the preferred embodiment of a apparatus of the present invention adapted for cleaning fluid systems used in stamping operations is illustrated in FIG. 2. The apparatus has an inlet feed pipe 22 from the stamping machine fluid tank preferably located at the lowermost point of the tank 12. The inlet feed pipe 22 is connected to a centrifugal pump 24 to pump the fluid through the apparatus. A suitable valve such as a ball valve 26 is preferably provided in the inlet line 22 between the tank 12 and pump 24 to allow the apparatus to be connected and disconnected from the tank 12 without affecting the operation of the tank. The outlet of the pump 24 is connected to the inlet of a centrifugal separator 40 of a design similar to that of U.S. Pat. No. 4,492,631. The centrifugal pump 24 pumps the fluid into the separator 40 at a flow rate and pressure to allow for optimum operation of the separator 40. The pipe 28 connecting the pump 24 and inlet of the separator 40 is preferably provided with a suitable pressure gauge 30 for monitoring the pressure of the fluid being pumped to the inlet of the separator 40. The fluid introduced into the separator 40 causes the rotor 42 in the separator 40 to rotate and clean the fluid by causing the contaminants to be deposited on the interior surface of the separator bowl 44. To improve the cleaning of the fluid and particularly removal of larger contaminants, the interior surface of the separator bowl 44 is provided with a thin layer of a suitable medium 46 to aid in trapping of the contaminants. The suitable medium 46 may be a filtering medium such as paper filter medium, open cell polymeric foam, synthetic fibrous filter medium or a magnetic material. Preferably, the suitable medium 46 is an open cell polymeric foam or synthetic fibrous material, more preferably synthetic fibrous material. The fibrous material has a large number of open pores and a large surface area to provide a significant capacity to trap contaminants, particularly the larger contaminants and is easily cleaned of the contaminants during routine cleaning of the centrifugal separator.

After the fluid has been cleaned in the separator 40 it is returned to the fluid tank 12 of the stamping machine through suitable outlet piping or tubing 32 preferably at an upper portion of the tank 12 near to the inlet for the pump 50 supplying the fluid to the industrial machine such as the stamping machine. The outlet piping or tubing 32 is also provided with a suitable check valve 34 to prevent fluid from re-entering the separator 40 and to allow the apparatus to be disconnected. The outlet piping or tubing 32 is preferably provided with a flow indicator 36 to monitor the flow of the fluid from the separator to the tank. A drain hose 38 with a suitable valve 39 is also provided to allow the apparatus to be drained for cleaning. The operation of the system is controlled by a control panel 60 as will be described further below.

Figure 4:
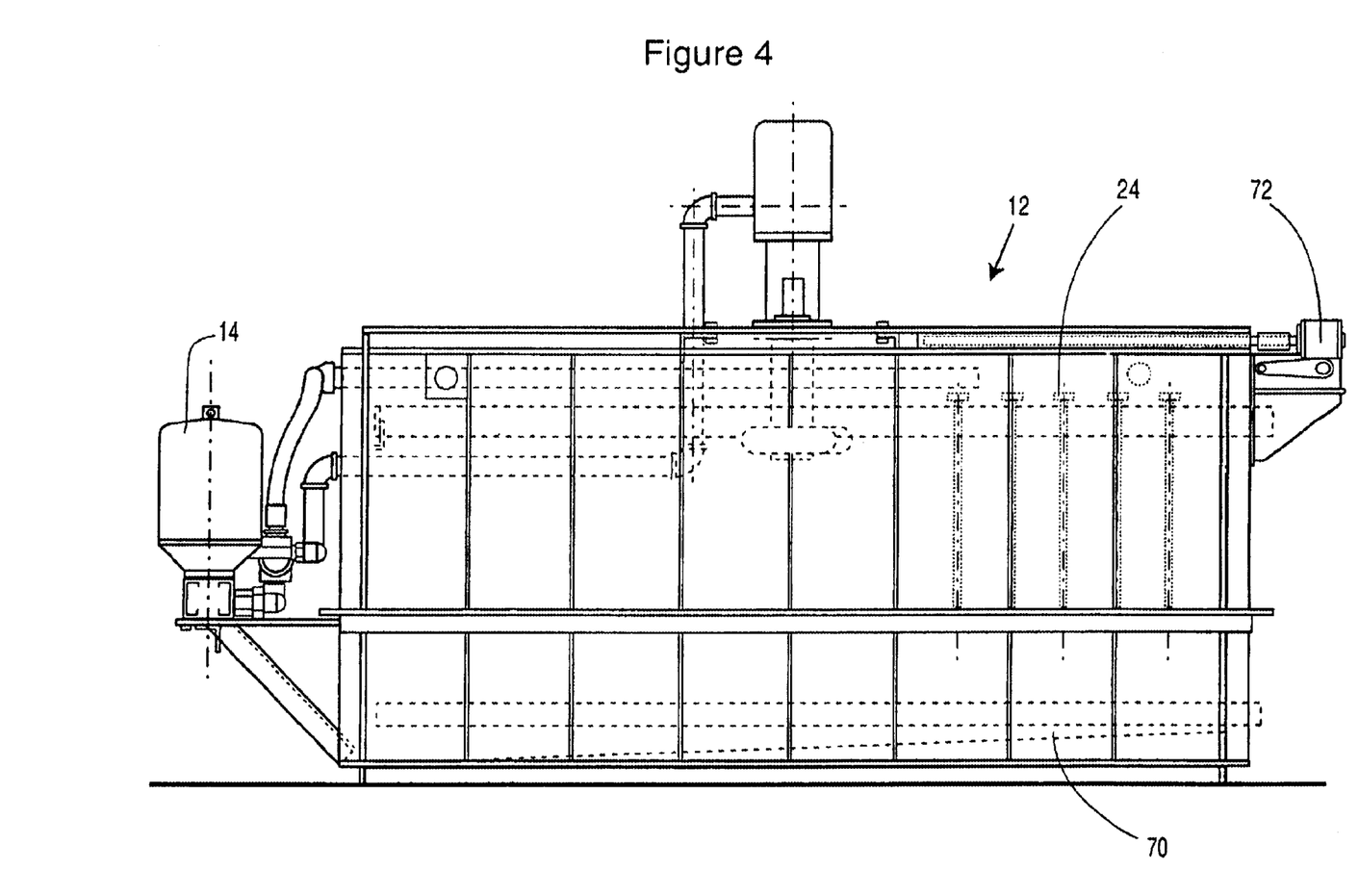
FIG. 4 is a side elevation view of a second embodiment of the filtering apparatus of the present invention illustrating the details of the fluid holding tank.
Figure 5:
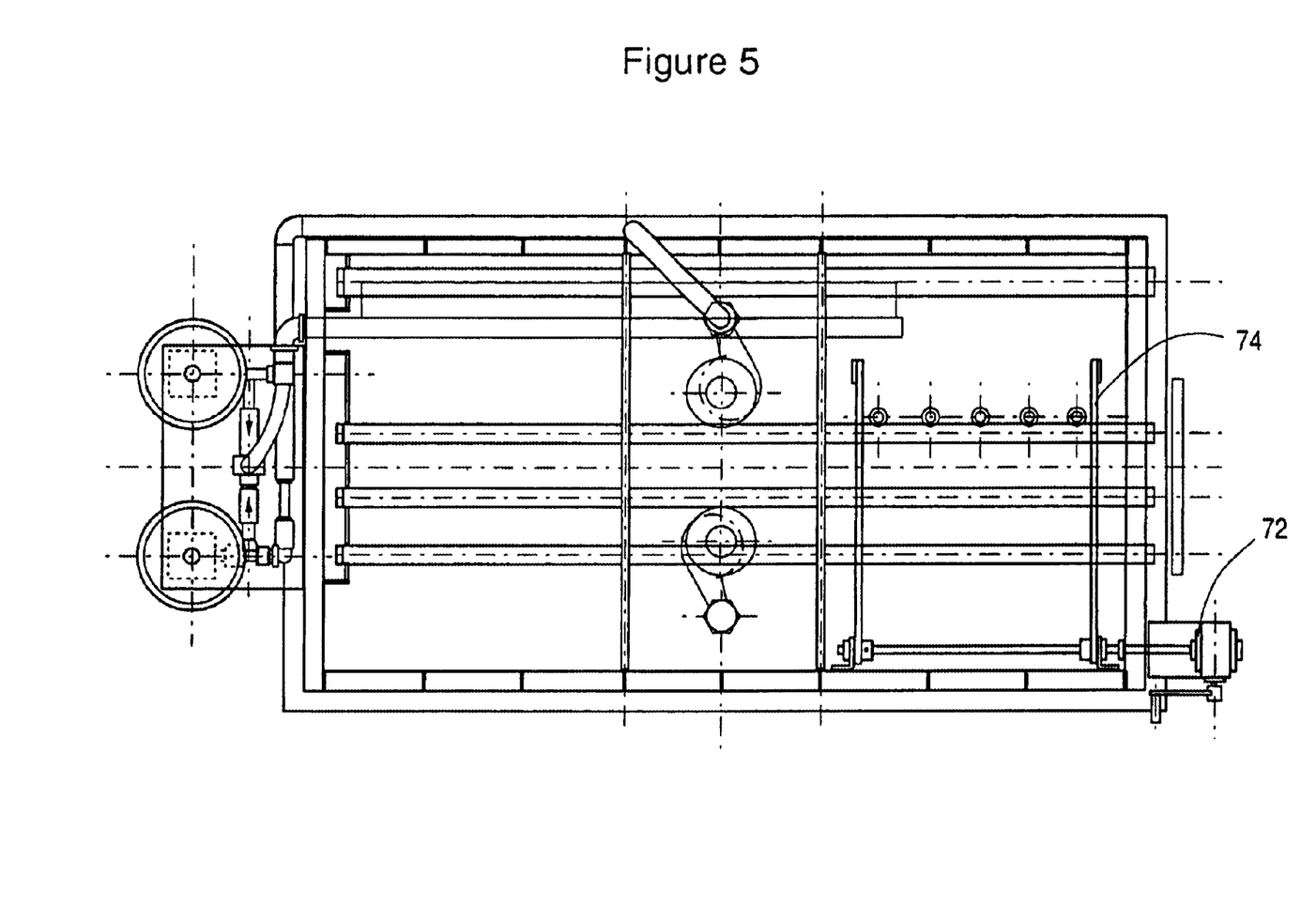
FIG. 5 is a top plan view of the apparatus of FIG. 4.

The tank 12 utilized in the cleaning apparatus of the present invention is modified to optimize the cleaning operation. As illustrated in FIGS. 4 and 5, the tank 12 is provided with a sloping bottom 70 which slopes in both of the linear directions of the tank 12 to provide a low point at one corner of the tank where the inlet line 22 to the centrifugal separator 40 is located. Alternatively, the bottom 70 may be V shaped to provide a low point near the center bottom of one wall. The low point is located at the opposite end of the tank from the inlet return pipe 72 from the stamping machine. By providing the tank with the bottom sloping away from the inlet return pipe 72 from the stamping machine, very heavy contaminants will have greater time to settle out in the tank and accumulate at the low point to be more easily removed by the centrifugal separator.

To aid in the removal of metal contaminants, the tank 12 may be provided with magnetic rods or baffles 74 preferably located close to the return line 72 from the industrial machine such as the stamping apparatus. In this way, the ferrous metal contaminants are removed from the fluid prior to the fluid being cleaned in the centrifugal separator 40. The tank 12 is also preferably provided with internal baffles 76 to dampen the fluid flow within the tank as fluid 12 is entering the tank and being pumped out of the tank. By dampening the fluid flow, the contaminant particles in the fluid are better able to settle out and be removed by the centrifugal separator 40.

Figure 6:
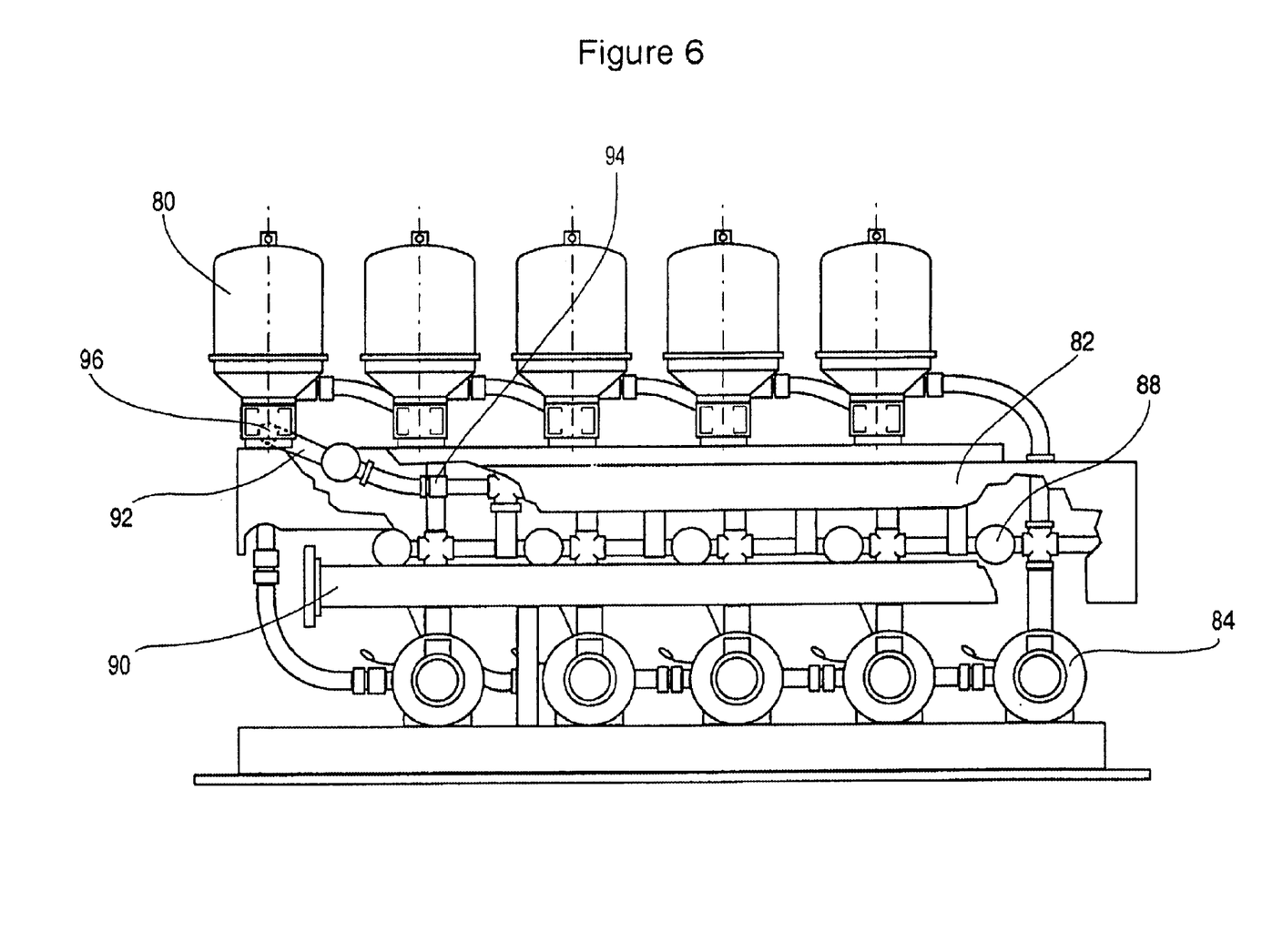
FIG. 6 is a side elevation view of another embodiment of a filtering apparatus of the present invention.
Figure 7:
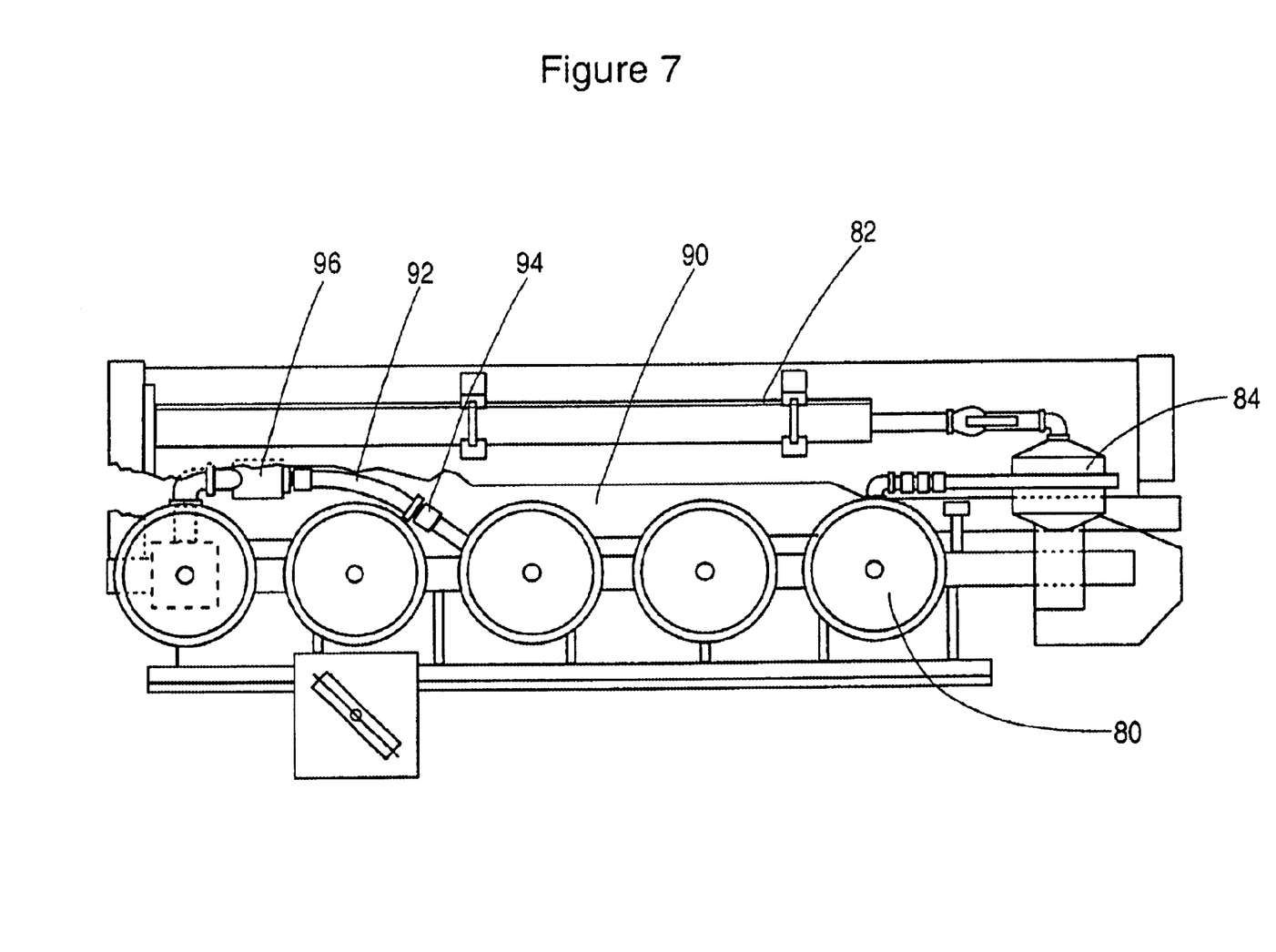
FIG. 7 is a top plan view of the apparatus of FIG. 6.
Figure 8:
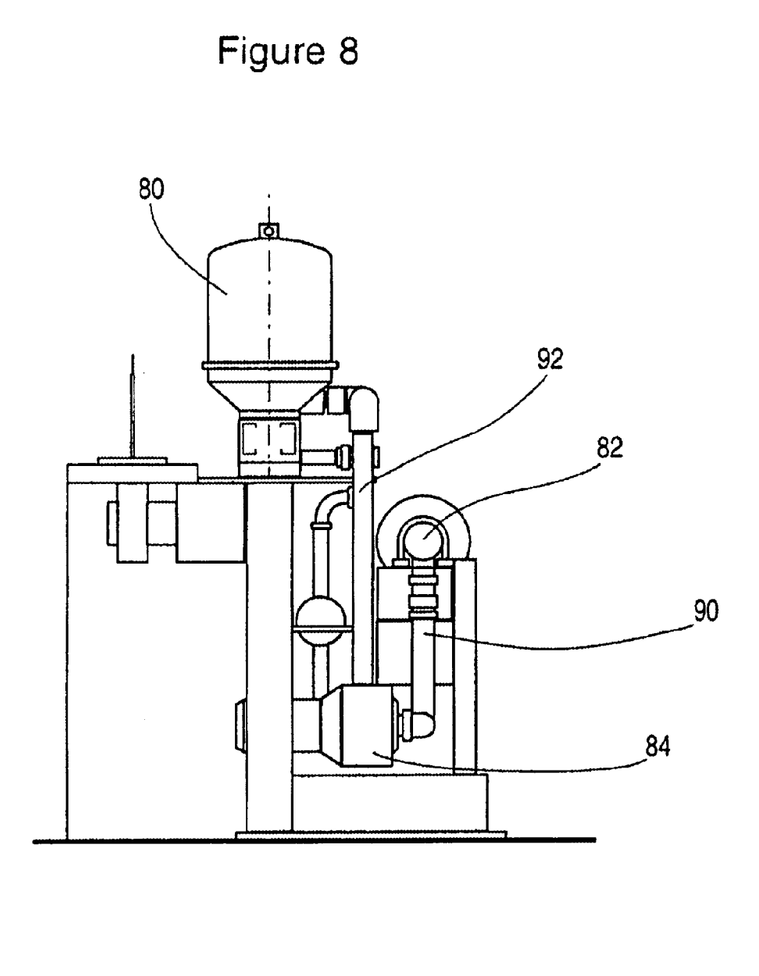
FIG. 8 is an end view of the apparatus of FIG. 6.

A third embodiment of a centrifugal separating apparatus of the present invention is illustrated in FIGS. 6, 7 and 8 having more than one centrifugal separator 80 connected in parallel. The apparatus has an inlet feed pipe from the fluid tank connected to an inlet manifold 82 to which a plurality of centrifugal pumps 84 are connected to pump the fluid through the centrifugal separators 80. The outlet inlet of each pump 81 is provided with a ball valve to allow the individual separator to be taken out of operation for cleaning and maintenance without affecting the other separators. The outlet of each pump is also provided with a suitable pressure gauge 88 and is connected to the inlet of an individual centrifugal separator 80 to pump the fluid into the separator 80 at a flow rate and pressure to allow for optimum operation of the separator. The fluid introduced into the separators 80 causes the rotors in the separators to rotate and clean the fluid by causing the contaminants to be deposited on the interior surfaces of the separator bowls. After the fluid has been cleaned in the separators it is returned to a return manifold 90 connected to each individual separator by a return pipe 92 provided with a check valve 94 to prevent backflow of fluid into the separator 80 when the separator is not running such as for maintenance and a flow meter 96 to measure the flow rate of the fluid cutting the separator. The return manifold 90 is connected to the fluid tank of the stamping machine through suitable outlet piping or tubing. A drain hose with a suitable valve is also provided to allow the individual separators to be drained for cleaning. The operation of this system is controlled by a control panel.

In operation, the fluid in the stamping apparatus is cleaned in bypass or in-line mode. Some of the fluid from the storage tank is pumped by the centrifugal pump into the centrifugal separator. By using a centrifugal pump to pump the fluid into the separator, the quality of the cleaning of the fluid is increased as the apparatus is easily controlled to optimize the cleaning method. The control panel controls the speed of the pump by monitoring the pressure in the system as indicated by the pressure gauge as well as the flow rate indicated by the flow meter. The speed of the pump is adjusted to provide the optimum rotational speed to the rotor of the centrifugal separator which is dependent upon the capacity of the separator and the nature of the fluid being cleaned. The rotational speed of the rotor should provide a centrifugal force sufficient to remove contaminants as small as one-tenth micron in diameter. The rotational speed of the rotor required to generate this force will depend upon the character of the fluid being cleaned, such as its viscosity and flowability. The lower the viscosity and greater the flowability of the fluid, the higher the flow rate from the pump to provide the proper rotational speed, for most industrial operations utilizing low viscosity fluids, the centrifugal force is generally between about 1000 g and 2000 g. For a small 2 gal separator, the rotor of the separator should have a rotational speed of about 5000 to 6000 RPM to achieve the desired force. For a larger capacity separator such as a 20 gal separator, a rotor speed of about 3000 to 4000 RPM will achieve the desired force.

As the rotor spins, the fluid is caused to impinge on the inner surface of the bowl and any filtering medium located there. The high centrifugal force of the fluid causes the dirt particles and other contaminants down to one-tenth of a micron to be forced out of the fluid and onto the centrifuge bowl surface or into the filter medium, where they accumulate and are kept from recirculating. The centrifugal force is so great that the dirt particles and other contaminants are compacted into a solid cake on the bowl wall even in the absence of a filter medium. This aids in the clean up operation of the separator as the bowl is easily removed and the compacted solids may be scraped from the bowl surface.

In order to maintain the proper operation of the separator, the fluid level in the separator must be monitored such that the bowl will not fill with fluid and reduce the filtering efficiency. This may be accomplished by the control panel monitoring the flow rate and pressure. If the flow rate decreases and/or the pressure increases it may indicate an increased fluid level in the separator. To maintain the proper fluid level, air from a source of compressed air is introduced into the separator bowl. Alternatively, the separator may be provided with a float valve as described in U.S. Pat. No. 4,492,631, and the air introduced into the bowl in response to the float valve indication of the fluid level.

The apparatus of the present invention is easily cleaned to remove the accumulated contaminants without requiring the operation of the stamping machine to be shut down. The pump is shut off and the valves closed to shut off the flow of fluid through the separator apparatus. Any fluid present in the apparatus may be drained through the drain pipe and the separator disassembled in the usual manner. The separator is the cleaned and after cleaning reassembled. The apparatus is then reconnected to the fluid tank to continue cleaning the fluid.

The apparatus of the present invention has been tested for cleaning efficiency in a stamping machine utilized in producing stamped metal parts for automotive manufacturing. The apparatus utilized a 20 gal separator running at about 3500 RPM to provide about 1500 g rotational force. The fluid utilized in the stamping operation was an SAE 2 lubricating fluid. The fluid at the inlet to the stamping operation was sampled for size and distribution of particulate contaminants utilizing an automatic particle counter and the result expressed according to the ISO Code 4406. The apparatus of the present invention resulted in achieving a fluid of ISO Code 14/11 compared to a fluid of ISO Code 17/13 with a standard bag filter. The fluid was significantly cleaner when using the apparatus of the present invention.

The apparatus for cleaning industrial lubricants used in industrial processes of the present invention offers many advantages over presently utilized systems. The apparatus of the present invention does not require the replacement of screens, cartridges or filter elements nor does it require backwashing for cleaning. The apparatus has low maintenance with no liquid loss during operation. The apparatus of the present invention provides fast, efficient and reliable operation with improved filtering by removing particles and contaminants as small as one-tenth of a micron, much below the limit of particles capable of being removed by other filtering methods.

By providing the apparatus of the present invention in an all in one unit of separator, pumps and tubing, the installation and operation of the apparatus is faster and easier to accomplish. In the preferred embodiment utilizing the tank with the separator, pumps and tubing, even easier installation and operation is achieved with minimal downtime of the industrial machine to which the apparatus is to be connected.

The apparatus of the present invention is suitable for cleaning fluids of many kinds used in diverse industrial applications. The apparatus can be used to clean hydraulic oil, stamping oil, cutting oil, and most other oils with contaminants. The apparatus can also be used to clean water based fluids including coolants and cleaning water. The apparatus can be used in many other applications such as spray nozzles, heat exchangers, parts washers, etc.

Depending upon the nature of the cleaning, the centrifugal separator may be modified in terms of material selected for the manufacture of the parts. For example, in operations utilizing water based fluids, the parts of the separator in contact with the fluid are preferably plated or stainless steel to reduce possible corrosion of the parts. For separators used to clean fluid from grinding operations which may contain significant amounts of abrasive particles, the moving parts of the separator are sealed or hardened to reduce possible abrasion of the parts. Depending upon the nature of the fluid, particularly in terms of viscosity or flowability, the impellers may be modified to optimize the system based upon the requirements. Thus for low viscosity or high flowability fluids, the size of the impeller is reduced to increase the force of the fluid. Similarly for higher viscosity fluids, the size or number of the impellers is increased to maintain optimum flow rates for the cleaning operation.

By providing clean fluid for operation, the apparatus of the present invention provides for optimum production, extended fluid, tool and machine life, reduces downtime and maintenance and extends pump life.

Although various preferred embodiments of the present invention have been described herein in detail, it will be appreciated by those skilled in the art, that variations may be made thereto without departing from the spirit of the invention or the scope of the appended claims.

I claim:

1. A method for cleaning industrial lubricants used in industrial processes, the method comprising providing a centrifugal separator apparatus connected as a bypass or in-line filter in a lubricating or washing fluid tank, the apparatus including more than one centrifugal separator, each separator having a casing and a rotor rotatably mounted in the casing, an inlet and an outlet, with the inlets of the separators connected to an inlet manifold and the outlets of the separators connected to an outlet manifold, a centrifugal pump provided between the tank, and the inlet manifold, and a source of compressed air provided connected to the casings of the separators, some of the fluid from the tank being pumped by the centrifugal pump into the separators to cause the rotors to rotate and impinge the fluid on the casings at a rotational force in a range of between about 1000 g and about 2000 g and clean the fluid, the cleaned fluid being returned to the tank, a control panel monitoring the operation of the separators and controlling the pump and source of compressed air to maintain the rotational force of the separators within the range of about 1000 g to about 2000 g.

2. A method for cleaning industrial lubricants used in industrial processes, the method comprising providing a centrifugal separator apparatus connected as a bypass or in-line filter in a lubricating or washing fluid tank, the tank comprises a sloping bottom which slopes in both linear directions of the tank to provide a low point at one corner of the tank the apparatus including a centrifugal separator having a casing and a rotor rotatably mounted in the casing, a centrifugal pump provided between the low point at one corner of the tank and an inlet of the separator, and a source of compressed air provided connected to the casing of the separator, some of the fluid from the tank being pumped by the centrifugal pump into the separator to cause the rotor to rotate and impinge the fluid on the casing at a rotational force in a range of between about 1000 g and about 2000 g and clean the fluid, the cleaned fluid being returned to the tank, a control panel monitoring the operation of the separator and controlling the pump and source of compressed air to maintain the rotational force of the separator within the range of about 1000 g to about 2000 g.

3. A centrifugal separator apparatus for use as a bypass or in-line filter in cleaning fluid utilized in industrial applications, the apparatus comprising more than one centrifugal separator, each centrifugal separator having a casing and a rotor rotatably mounted in the casing, an inlet and an outlet, with the inlets of the centrifugal separators connected to an inlet manifold and the outlets of the centrifugal separators connected to an outlet manifold a centrifugal pump between a cleaning fluid tank and the inlet manifold for pumping some of the fluid from the tank into the separators to cause the rotors to rotate at a speed sufficient to provide a rotational force of the fluid impinging on the casings in a range of between about 1000 g and about 2000 g to thereby clean the fluid, a source of compressed air connected to the casings of the separators for maintaining the volume of air in the casings, and a control panel for monitoring the operation of the separators and for controlling the pump and source of compressed air to maintain the rotational force of the separators within the range of about 1000 g to about 2000 g.

4. A centrifugal separator apparatus for use as a bypass or in-line filter to cleaning fluid utilized in industrial applications, the apparatus comprising a centrifugal separator having a casing and a rotor rotatably mounted in the casing, a centrifugal pump between a cleaning fluid tank and an inlet of the separator the tank comprises a sloping bottom which slopes in both linear directions of the tank to provide a low point at one corner of the tank where the the centriguagal pump is located for pumping some of the fluid from the tank into the separator to cause the rotor to rotate at a speed sufficient to provide a rotational force of the fluid impinging on the casing in a range of between about 1000 g and about 2000 g to thereby clean the fluid, a source of compressed air connected to the casing of the separator for maintaining the volume of air in the casing, and a control panel for monitoring the operation of the separator and for controlling the pump and source of compressed air to maintain the rotational force of the separator within the range of about 1000 g to about 2000 g.

* * * * *